United States Patent
Hino et al.

(10) Patent No.: US 8,182,901 B2
(45) Date of Patent: May 22, 2012

(54) PRINTED BIODEGRADABLE PLASTIC FILM

(75) Inventors: Tomoharu Hino, Kagawa (JP); Toru Ohara, Kagawa (JP)

(73) Assignee: Uni-Charm Co., Ltd., Ehime (JP)

( * ) Notice: Subject to any disclaimer, the term of this patent is extended or adjusted under 35 U.S.C. 154(b) by 1483 days.

(21) Appl. No.: 10/477,917

(22) PCT Filed: Mar. 18, 2003

(86) PCT No.: PCT/JP03/03264
§ 371 (c)(1),
(2), (4) Date: Jul. 20, 2004

(87) PCT Pub. No.: WO03/082963
PCT Pub. Date: Oct. 9, 2003

(65) Prior Publication Data
US 2006/0204727 A1 Sep. 14, 2006

(30) Foreign Application Priority Data
Mar. 29, 2002 (JP) ................. 2002-096126

(51) Int. Cl.
*B41M 5/00* (2006.01)

(52) U.S. Cl. ............ 428/195.1; 428/215; 428/34.2

(58) Field of Classification Search ............ 428/215, 428/34.2, 195.1
See application file for complete search history.

(56) References Cited

U.S. PATENT DOCUMENTS

| | | | | |
|---|---|---|---|---|
| 2,311,156 | A | * | 2/1943 | Casto ............................ 428/165 |
| 4,945,252 | A | * | 7/1990 | Lerner et al. .................. 250/548 |
| 5,338,822 | A | * | 8/1994 | Gruber et al. ................. 528/354 |
| 5,849,401 | A | * | 12/1998 | El-Afandi et al. ............ 428/215 |
| 6,412,938 | B1 | * | 7/2002 | Markham et al. ............. 347/100 |
| 6,635,356 | B2 | * | 10/2003 | Miki et al. ..................... 428/480 |
| 7,297,394 | B2 | * | 11/2007 | Khemani et al. .............. 428/220 |
| 2003/0113564 | A1 | * | 6/2003 | Noda et al. .................... 428/480 |
| 2005/0215662 | A1 | * | 9/2005 | Masaro et al. ................ 523/160 |

FOREIGN PATENT DOCUMENTS

| | | |
|---|---|---|
| EP | 97 4615 A1 | 1/2000 |
| EP | 1340690 B1 * | 9/2001 |
| EP | 1164030 | 12/2001 |
| JP | 7-81274 A | 3/1995 |
| JP | 7195814 | 8/1995 |
| JP | 8-281878 A | 10/1996 |
| JP | 2000096491 | 4/2000 |
| JP | 2000-158596 A | 6/2000 |
| JP | 2001-49098 A | 2/2001 |
| JP | 2002166966 A * | 6/2002 |
| JP | 2003072009 * | 3/2003 |

OTHER PUBLICATIONS

European Search Report for Application No. 03745412.1 mailed Mar. 20, 2008.

* cited by examiner

*Primary Examiner* — D Lawrence Tarazano
*Assistant Examiner* — Tamra L Amakwe
(74) *Attorney, Agent, or Firm* — Lowe, Hauptman, Ham & Berner, LLP

(57) ABSTRACT

A biodegradable plastic film 1 has at least one surface formed with a printed region 5. Within the region 5, non-printed sub-regions 7 are rather evenly distributed.

23 Claims, 3 Drawing Sheets

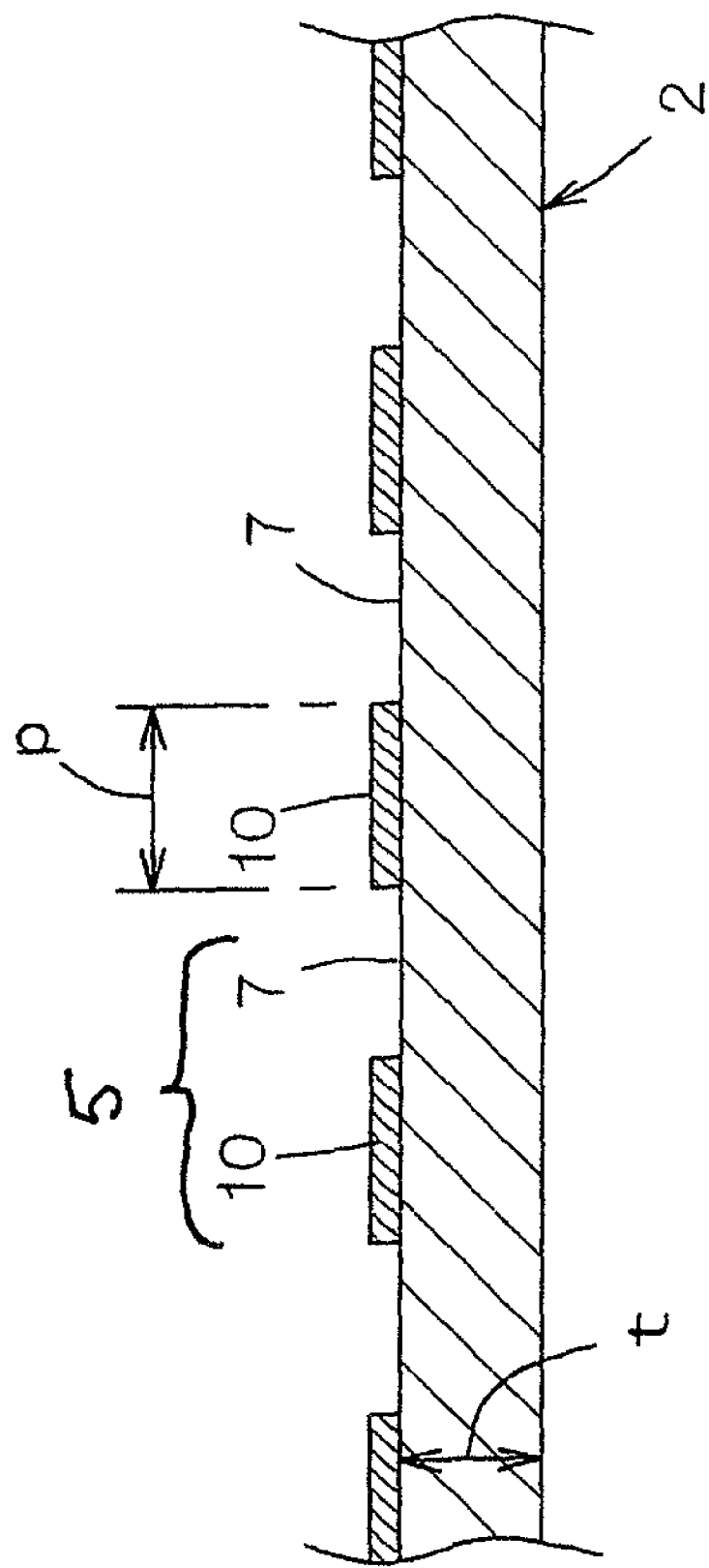

PRINTED BIODEGRADABLE PLASTIC FILM

TECHNICAL FIELD OF THE INVENTION

This invention relates to a printed biodegradable plastic film and more particularly, to such a film, for example, a stock material for a disposable sanitary article and the like.

RELATED ART

Both biodegradable plastic films and the film provided with a printed region are well known. Envelopes made of the films are also well known. The biodegradable plastic films are good for the environment because they do not remain in the earth for a long time due to a biodegrading effect of soil microorganisms even if they are buried in the earth.

In the case of the conventional printed biodegradable plastic film, the layer of printing ink may hinder the biodegrading effect so that degradation of the film may be impeded or retard. Consequently, the intended purpose of this film has often been unsatisfied.

DISCLOSURE OF THE INVENTION

It is an object of this invention to improve a printed biodegradable plastic film so that a biodegradability of the film is hindered by the presence of a printed region.

According to this invention, there is provided a biodegradable plastic film which has at least one surface formed with a printed region.

The biodegradable plastic film further comprises non-printed sub-regions distributed rather evenly within the printed region formed on the plastic film, and totally occupying 10-20% of the printed region.

This invention includes the following embodiments.
(1) The non-printed sub-regions comprise a plurality of individual non-printed sub-regions each enclosed with printing ink defining the printed region and dimensioned to be in a range of 15-30 μm in two directions orthogonal to each other.
(2) Each of the individual non-printed sub-regions has at least one of the adjacent individual non-printed sub-regions with a distance shorter than twice as long as a thickness of the plastic film.
(3) The printed region is formed on an outer surface of the plastic film in the form of an envelope.
(4) The envelope is used as a package for a disposable diaper, disposable training pants or a sanitary napkin.
(5) The biodegradable plastic film is made of polyethylene succinate, polybutylene succinate or polylactic acid.

BRIEF DESCRIPTION OF THE DRAWINGS

FIG. 3 is a cross-sectional view taken along a line III-III in FIG. 2.

DETAILED DESCRIPTION OF THE PREFERRED EMBODIMENTS

Details of a printed biodegradable plastic film according to this invention will be more fully understood from the description given hereunder with reference to the accompanying drawings.

Figure 1:
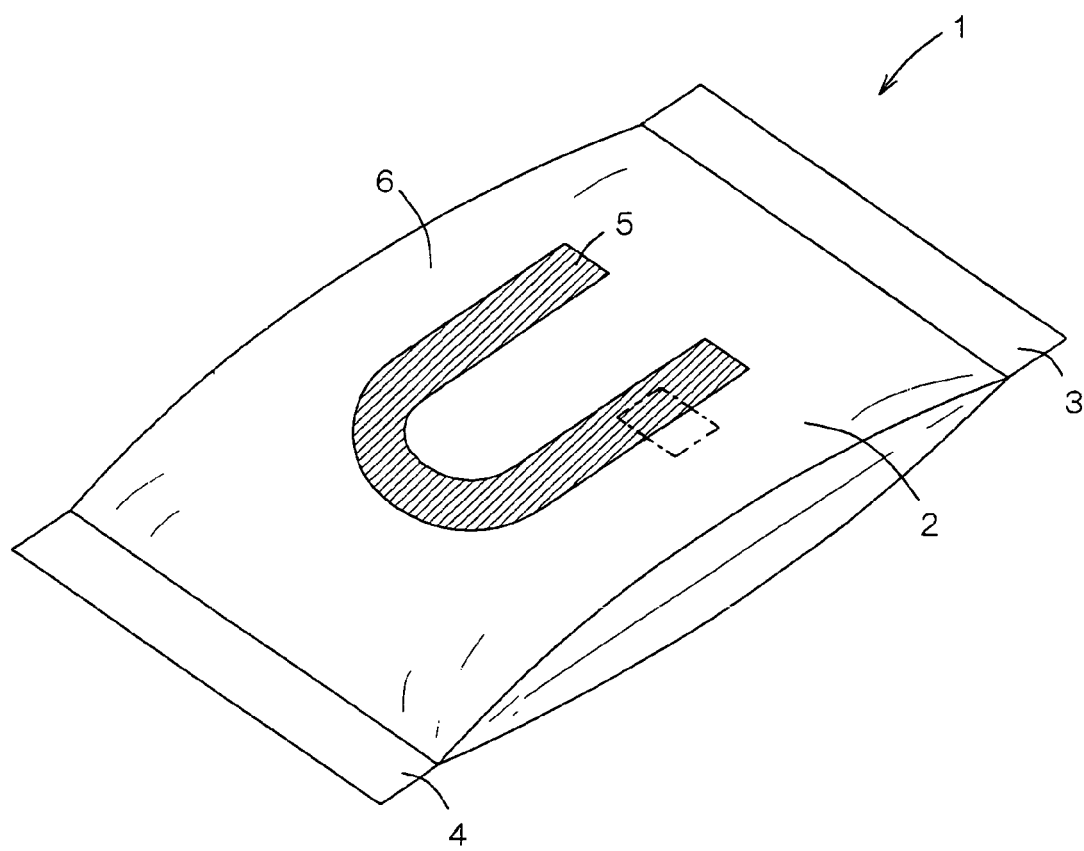
FIG. 1 is a perspective view showing an exemplary application of a printed biodegradable plastic film.

FIG. 1 is a perspective view showing an individual package for disposable bodily discharge absorbent article such as a disposable diaper, disposable training pants or a sanitary napkin. The individual package 1 is made of a biodegradable plastic film 2 and formed on its surface with a U-shaped printed region 5 and a non-printed region 6 around the printed region 5 wherein the individual package 1 is sealed along its upper and lower ends 3, 4 by heat-sealing or adhesively bonding layers of the film 2 opposed to each other.

The film 2 is made of, for example, polyethylene succinate, polybutylene succinate or polylactic acid and biodegradable in the presence of soil microorganism such as bacillus thuringiensis. As a material for the individual package 1, the film of plastics having a thickness of 10-100 μm is preferably used. Use of the film 2 will allows the individual package 1 to have a desired strength and to be in close contact with the content such as a diaper.

Figure 2:
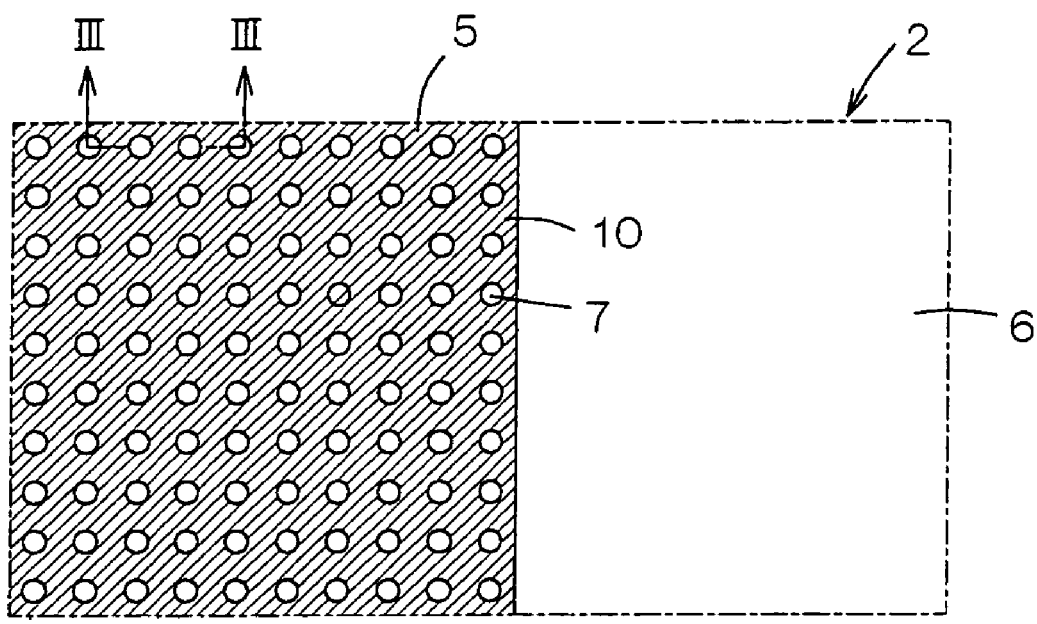
FIG. 2 is a scale-enlarged diagram showing important parts in FIG. 1.

FIG. 2 is a scale-enlarged diagram of the important part of the individual package 1 enclosed by an imaginary line in FIG. 1, partially illustrating the printed region 5 and the non-printed region 6. The printed region 5 has its figuration defined by printing ink 10 and a plurality of individual non-printed sub-regions 7 are distributed within the printed region 5. The individual non-printed sub-regions 7 are respectively encircled by the printing ink 10 and distributed substantially evenly within the region 5. Preferably, each of these individual non-printed sub-regions 7 is dimensioned to be 15-30 μm in two directions orthogonal to each other and these non-printed sub-regions 7 totally occupy 10-20% of the area of the printed region 5.

FIG. 3 is a cross-sectional view of the printed region as taken along a line III-III in FIG. 2. The film 2 has a thickness t and the individual non-printed regions 7 are spaced from each other with a distance p. The individual non-printed region 7 is preferably spaced from at least one of the adjacent non-printed sub-regions 7 by the distance p shorter than twice as long as the thickness t of the film 2.

If the individual package 1 having the printed region 5 as illustrated by FIGS. 2 and 3 is buried, for example, in the earth after the content such as a diaper has been taken out, the outer surface of this individual package 1 is first exposed to the soil microorganisms and the non-printed region 6 of the film 2 begins to be biodegraded rapidly. The biodegrading effect of the microorganisms rarely acts upon the film 2 through the layer of printing ink 10 unless the printing ink 10 is biodegradable. In the non-printed sub-regions 7, however, the biodegrading effect of the microorganisms directly affects the film 2. Particularly in the individual non-printed sub-regions 7 arranged so that each pair of the adjacent individual non-printed sub-regions 7 are spaced from each other by the distance p shorter than twice as long as the thickness t of the film 2, the microorganisms can rapidly biodegrade the film 2 not only the non-printed sub-regions 7 in the thickness direction of the film 2 but also an area defined between each pair of the adjacent non-printed sub-regions 7, 7 and covered with the ink 10 in the direction orthogonal to the thickness direction. So far as the individual non-printed sub-regions 7 totally occupy 10-20% of the printed region 5, these non-printed sub-regions 7 do not adversely affect the appearance of the printed region 5 and the area of the film 2 covered with the printing ink 10 can be biodegraded at a rate substantially same as the rate at which the non-printed sub-regions 7 are biodegraded. If the individual package 1 is buried in the earth not in the form of the envelope but in the form of the developed film, both surfaces of the film are exposed to the biodegrading effect of the soil microorganisms and the film is degraded more rapidly.

It is possible to form the printed region 5 on both surfaces of the film 2. Furthermore, application of the film 2 having the printed region 5 is not specified and the individual package 1 as illustrated is merely one specific embodiment of the application. It is also possible to implement the non-printed sub-regions 7 in the form of continuous stripes, instead of the discrete sub-regions as illustrated within the printed region 5.

With the printed biodegradable plastic film according to this invention in which the non-printed sub-regions are evenly distributed within the printed region, the biodegradation of the film in the region covered with the printing ink are not hindered or retarded due to the presence of the printing ink.

The invention claimed is:

1. A biodegradable plastic film comprising at least one surface formed with a printed region, wherein said plastic film further comprises non-printed sub-regions distributed rather evenly within said printed region formed on said plastic film, and all said non-printed sub-regions occupy 10-20% of said printed region;
   wherein said non-printed sub-regions comprise a plurality of individual non-printed sub-regions each of which is enclosed within printing ink defining said printed region and is dimensioned to be in a range of 15-30 μm in two directions orthogonal to each other.

2. The plastic film according to claim 1, wherein adjacent said individual non-printed sub-regions are spaced from one another by a distance shorter than twice the thickness of said plastic film.

3. The plastic film according to claim 2, wherein the thickness of said plastic film is in the range of 10-100 μm.

4. The plastic film according to claim 3, wherein said biodegradable plastic film is made of polyethylene succinate, polybutylene succinate or polylactic acid.

5. The plastic film according to claim 4, wherein
   said plastic film is in form of an envelope; and
   said printed region is formed on an outer surface of said envelope.

6. The plastic film according to claim 5, wherein biodegradability of areas of the outer surface of the envelope that are covered by said ink is substantially same as biodegradability of the outer surface of the envelope in the non-printed sub-regions.

7. The plastic film according to claim 4, wherein said ink is non-biodegradable.

8. The plastic film according to claim 7, wherein a biodegrading rate of areas of the film that are covered by said ink is substantially same as biodegradability of the film in the non-printed sub-regions.

9. The plastic film according to claim 1, wherein
   said plastic film is in form of an envelope; and
   said printed region is formed on an outer surface of said envelope.

10. The plastic film according to claim 9, wherein said envelope is used as a package for a disposable diaper, disposable training pants or a sanitary napkin.

11. The plastic film according to claim 1, wherein said biodegradable plastic film is made of polyethylene succinate, polybutylene succinate or polylactic acid.

12. The plastic film according to claim 1, wherein a biodegrading rate of areas of the film that are covered by said ink is substantially same as biodegradability of the film in the non-printed sub-regions.

13. A biodegradable plastic film comprising at least one surface partially covered with ink that defines a printed region,
    wherein
    said at least one surface of the film further comprises a plurality of individual, discrete non-printed sub-regions each of which is completely encircled by the ink defining said printed region;
    said non-printed sub-regions are distributed evenly within said printed region;
    each of said individual, discrete non-printed sub-regions is dimensioned to be in a range of 15-30 μm in two directions orthogonal to each other;
    all said non-printed sub-regions occupy 10-20% of said printed region; and
    adjacent said non-printed sub-regions are spaced from one another by a distance shorter than twice the thickness of said plastic film.

14. The plastic film according to claim 13, wherein said ink extends continuously throughout said printed region and around every one of said individual, discrete non-printed sub-regions.

15. The plastic film according to claim 14, wherein the thickness of said plastic film is in the range of 10-100 μm.

16. The plastic film according to claim 15, wherein said biodegradable plastic film is made of polyethylene succinate, polybutylene succinate or polylactic acid.

17. The plastic film according to claim 16, wherein said ink is non-biodegradable.

18. The plastic film according to claim 17, wherein areas of the film that are covered by said ink have a biodegrading rate, determined from said at least one surface of the film, substantially same as that of the non-printed sub-regions of the film.

19. The plastic film according to claim 16, wherein
    said plastic film is in form of an envelope; and
    said printed region is formed on an outer surface of said envelope.

20. The plastic film according to claim 19, wherein areas of the film that are covered by said ink have a biodegrading rate, determined from said outer surface of the envelope, substantially same as that of the non-printed sub-regions of the film.

21. The plastic film according to claim 13, wherein areas of the film that are covered by said ink have a biodegrading rate, determined from said at least one surface of the film, substantially same as that of the non-printed sub-regions of the film.

22. A package, comprising:
    the plastic film according to claim 5; and
    one of a disposable diaper, a pair of disposable training pants or a sanitary napkin packed in said envelope.

23. A package, comprising:
    the plastic film according to claim 19; and
    one of a disposable diaper, a pair of disposable training pants or a sanitary napkin packed in said envelope.

* * * * *